United States Patent [19]

Crounse

[11] 4,412,950

[45] Nov. 1, 1983

[54] MONOAZO AND DISAZO COLORANTS

[75] Inventor: Nathan N. Crounse, Myrtle Beach, S.C.

[73] Assignee: Sterling Drug Inc., New York, N.Y.

[21] Appl. No.: 361,187

[22] Filed: Mar. 24, 1982

Related U.S. Application Data

[62] Division of Ser. No. 195,128, Oct. 8, 1980, Pat. No. 4,376,729.

[51] Int. Cl.$^3$ ............................................... C09B 46/00
[52] U.S. Cl. ..................................... 260/157; 260/160; 260/174; 260/176; 260/178; 260/184; 260/187; 260/191
[58] Field of Search ............... 260/157, 174, 176, 178, 260/184, 187, 191, 160

[56] References Cited

U.S. PATENT DOCUMENTS 2,863,875 12/1958 Bienert et al. ............... 260/151 UX
3,096,322 7/1963 Straley et al. ............... 260/157 UX

FOREIGN PATENT DOCUMENTS 1253766 4/1960 France ......................... 260/157 UX

*Primary Examiner*—Paul F. Shaver
*Attorney, Agent, or Firm*—Terrence E. Miesle; Lynn T. Fletcher; B. Woodrow Wyatt

[57] ABSTRACT

This invention relates to novel (N-substituted sulfonamido) monoazo and disazo compounds, to acid-addition salts of said azo compounds which are useful as direct dyes particularly in the dyeing of cellulose, to novel (N-substituted sulfonamido) substituted nitrobenzene, aniline and acetanilide intermediates to said azo compounds and to methods of preparation of said azo compounds and said intermediates to said azo compounds.

19 Claims, No Drawings

MONOAZO AND DISAZO COLORANTS

This application is a division, of application Ser. No. 195,128, filed Oct. 8, 1980, now U.S. Pat. No. 4,376,729.

BACKGROUND OF THE INVENTION (a) Field of the Invention

This invention relates to a group of compounds classified in the field of chemistry and more particularly to novel monoazo and disazo compounds useful as direct dyes, particularly in the dyeing of cellulose; to the acid-addition salts thereof; to nitrobenzene, aniline and acetanilide intermediates thereto; and to processes for preparing said monoazo and disazo compounds, said acid-addition salts and said nitrobenzene, aniline and acetanilide intermediates.

(b) Description of the Prior Art

A class of compounds known as direct dyes are known to be useful as dyeing agents for paper and fabrics. Among this group of direct dyes there are water-soluble azo and disazo dyestuffs and their acid-addition salts. However, heretofore known water-soluble azo and disazo dyestuffs and their acid-addition salts have suffered from a number of deficiencies when employed as dyes for coloring cellulose in the form of bleached pulp of the type used for the manufacture of household paper goods such as paper napkins, paper toweling, facial tissues and so forth. Thus, they have been found to bleed undesirably out of paper products colored with them when the article is brought into contact with common household solutions, for example, water, milk, soap solutions, detergent solutions, alcoholic beverages, vinegar, rubbing alcohol, and so forth. They have also been found to have relatively poor substantivity to bleached pulp and suffer from a low rate and degree of exhaust from dyeing solutions containing them. They have also been found to have a relatively poor degree of color discharge when bleached with hypochlorite or "chlorine" bleach. There is thus a need for azo dyestuffs for coloring bleached pulp which have a high bleed resistance, good substantivity, both a high rate and a high degree of exhaust from aqueous dyeing solutions in which they are utilized, and which have a high degree of color discharge when bleached with hypochlorite or "chlorine" bleach.

The following items to date appear to constitute the most relevant prior art with regard to the instant invention.

U.S. Pat. No. 2,863,875 (issued Dec. 9, 1958) discloses azo dyestuffs containing the radical [—SO$_2$—N—(R$_1$)(R$_2$NR$_3$R$_4$)]$_n$ wherein R$_1$ is hydrogen or a lower alkyl, R$_2$ is a lower alkylene, R$_3$ and R$_4$ are lower alkyl or hydroxy lower alkyl, and n is one to eight. The products are taught to be useful for dyeing cotton, wool, cellulose, polyamides, polyacrylics, paper and paper raw materials.

U.S. Pat. No. 3,096,322 (issued July 2, 1963) teaches monoazo dyestuffs and their precursor anilines and acetanilides bearing the radical —SO$_2$NHRN(R$_1$)$_2$ wherein R represents an alkylene radical having 2 or 3 carbon atoms and R$_1$ represents an alkyl radical having 1 to 4 carbon atoms or N(R$_1$)$_2$ collectively represents the heterocyclic piperidyl or morpholinyl radicals. The azo compounds are taught to be useful for dyeing acrylic fibers.

French Pat. No. 1,253,766 (issued Apr. 11, 1960) teaches a monoazo dyestuff bearing the radical

wherein Y is a n alkylene and X is a 3 or 4 carbon alkylene. The azo compounds are taught to be useful when complexed with cobalt or chromium for dyeing wool, silk and polyamides.

SUMMARY OF THE INVENTION

In its composition of matter aspect, the invention relates to novel (N-substituted sulfonamido) monoazo and disazo compounds useful for coloring natural fibers, synthetic fiber-forming material and cellulosic materials as well as in the manufacture of paper, varnishes, inks, coatings and plastics and to the acid-addition salt forms of the (N-substituted sulfonamido) monoazo and disazo compounds.

In another of its composition of matter aspects, the invention relates to novel (N-substituted sulfonamido) substituted nitrobenzenes, anilines and acetanilides.

In one of its process aspects, the invention relates to a process for preparing the novel (N-substituted sulfonamido) monoazo and disazo compounds which comprises diazotizing an appropriate (N-substituted sulfonamido) aniline and coupling the resulting diazonium salt with a coupling component.

In yet another of its process aspects, the invention relates to a process for preparing novel (N-substituted sulfonamido) monoazo and disazo compounds which comprises in the first step reacting a monoazo or disazo compound containing one or more sulfonic acid moieties with thionyl chloride to obtain a chlorosulfonyl monoazo or disazo compound which is interacted in a second step with the appropriate diamine or (2-aminoethyl)-2-imidazolidinone.

In another of its process aspects, the invention relates to a process for preparing the novel (N-substituted sulfonamido) substituted nitrobenzenes, anilines and acetanilides which comprises in a first step chlorosulfonating a nitrobenzene or an acetanilide and in a second step interacting the chlorosulfonated nitrobenzene or acetanilide with the appropriate diamine or (2-aminoethyl)-2-imidazolidinone and if the aniline is desired, the acetyl moiety can be removed in an acid hydrolysis, or the nitro moiety can be reduced.

DETAILED DESCRIPTION INCLUSIVE OF THE PREFERRED EMBODIMENTS

More specifically, this invention in the first of its composition of matter aspects, relates to novel disazo compounds bearing (N-substituted sulfonamido) groups said disazo compounds selected from the group consisting of

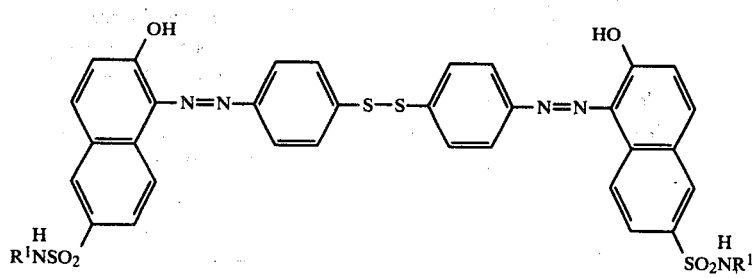
Formula I
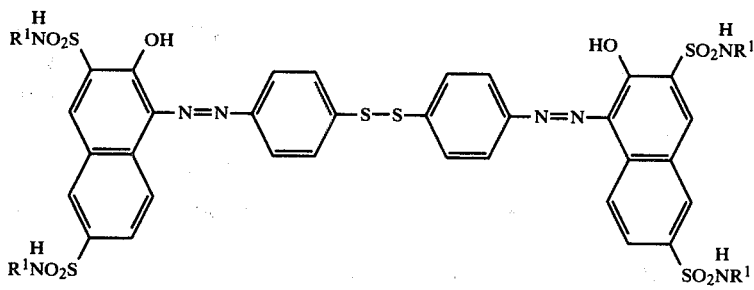
Formula II
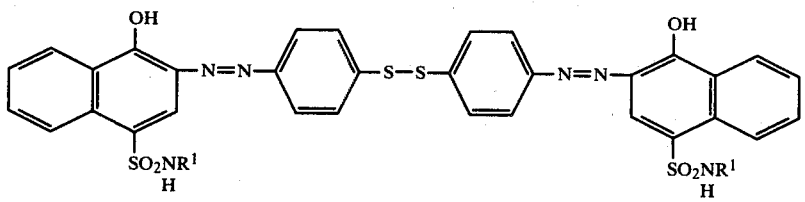
Formula III
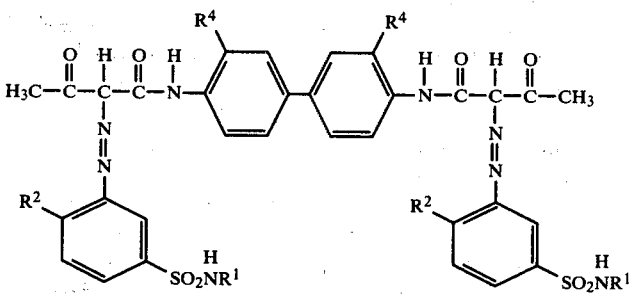
Formula IV
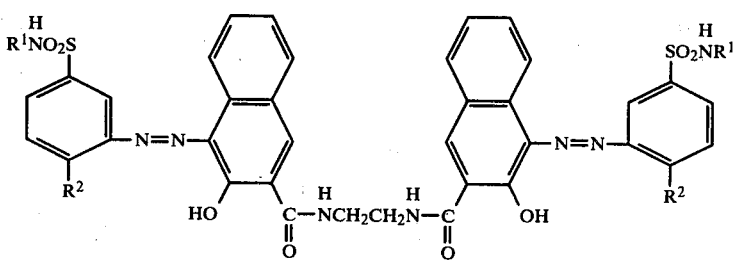
Formula V
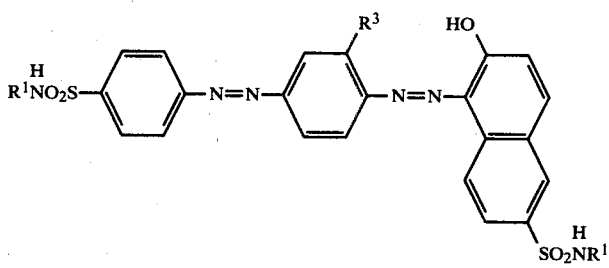
Formula VI
$R^1$ represents a moiety selected from the group consisting of alkylene-NH-alkylene-$NH_2$, alkylene-N-(non-tertiary $C_1$ to $C_4$ alkyl)$_2$, alkylene NCH₂CH₂NHC=O and alkylene NCH₂CH₂N=CCH₃ in which alkylene represents -CH₂CH₂- and —CH₂CH₂CH₂— $R^2$, $R^3$, $R^4$ and $R^5$ represent hydrogen, $C_1$–$C_3$ alkyl or $C_1$–$C_3$ alkoxy; or the acid-addition salt forms of said disazo compounds.

In a first particular embodiment in accordance with the first of its composition of matter aspects, the invention sought to be patented resides in the novel (N-substituted sulfonamido) disazo compounds having the formula

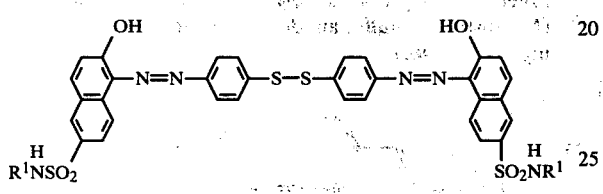

in which $R^1$ has the same respective meanings given in Formula I.

In a second particular embodiment in accordance with the first of its composition of matter aspects, the invention sought to be patented resides in the novel (N-substituted sulfonamido) disazo compounds having the formula

in which $R^1$ has the same respective meanings given in Formula I.

In a third particular embodiment in accordance with the first of its composition of matter aspects, the invention sought to be patented resides in the novel (N-substituted sulfonamido) disazo compounds having the formula

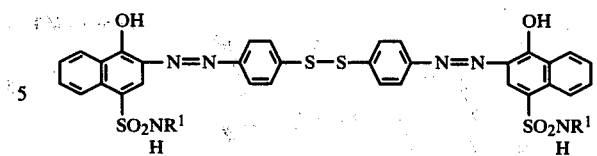

in which $R^1$ has the same respective meanings given in Formula I.

In a fourth particular embodiment in accordance with the first of its composition of matter aspects, the invention sought to be patented resides in the novel (N-substituted sulfonamido) disazo compounds having the formula

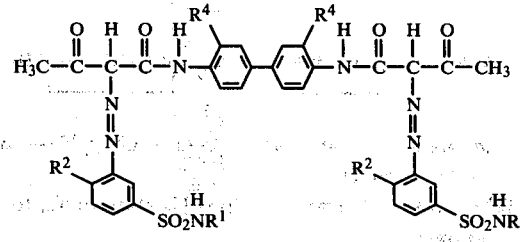

in which $R^1$ and $R^2$ each have the same respective meanings given in Formula IV.

In a fifth particular embodiment in accordance with the first of its composition of matter aspects, the invention sought to be patented resides in the novel (N-substituted sulfonamido) disazo compounds having the formula

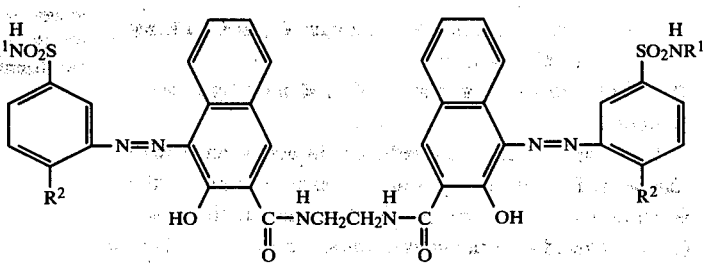

in which $R^1$ and $R^2$ each have the same respective meanings given in Formula V.

In a sixth particular embodiment in accordance with the first of its composition of matter aspects, the invention sought to be patented resides in the novel (N-substituted sulfonamido) disazo compounds having the formula

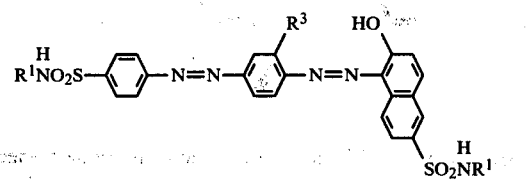

in which $R^1$ and $R^3$ each have the same respective meanings given in Formula VI.

In the second of its composition of matter aspects, the invention sought to be patented resides in novel (N-substituted sulfonamido) monoazo compounds having the formula

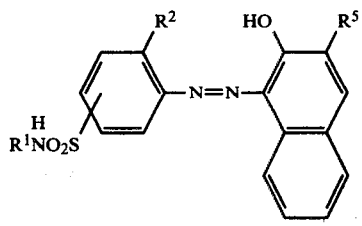

Formula VII in which
R¹ represents a moiety selected from the group consisting of alkylene-NH-alkylene-NH₂, alkylene-N-(non-tertiary C₁ to C₄ alkyl)₂, alkylene-NCH₂CH₂NHC=O, alkylene-NCH₂CH₂N=CCH₃
|_____|    |_____| in which alkylene represents —CH₂CH₂— and —CH₂CH₂CH₂—;

R² represents hydrogen, C₁ to C₃ alkyl or C₁ to C₃ alkoxy;

R⁵ represents hydrogen or

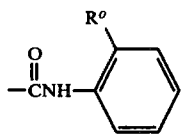

in which R⁰ represents hydrogen, C₁ to C₃ alkoxy or C₁ to C₃ alkyl; or
the acid-addition salt forms of said monoazo compounds.

In a first particular embodiment in accordance with the second of its composition of matter aspects, the invention sought to be patented resides in the novel (N-substituted sulfonamido) monoazo compounds having the formula

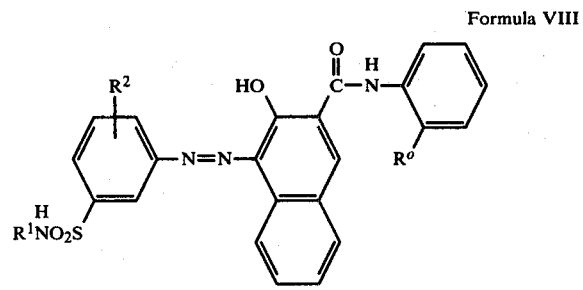

Formula VIII in which R¹, R² and R⁰ each have the same respective meanings given in Formula VII.

In a second particular embodiment in accordance with the second of its composition of matter aspects, the invention sought to be patented resides in the novel (N-substituted sulfonamido) monoazo compounds having the formula

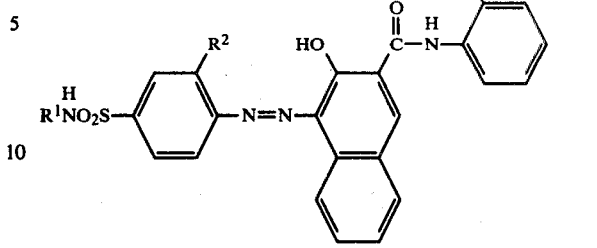

Formula IX in which R¹, R² and R⁰ each have the same respective meanings given in Formula VII.

In a third particular embodiment in accordance with the second of its composition of matter aspects, the invention sought to be patented resides in the novel (N-substituted sulfonamido) monoazo compounds having the formula

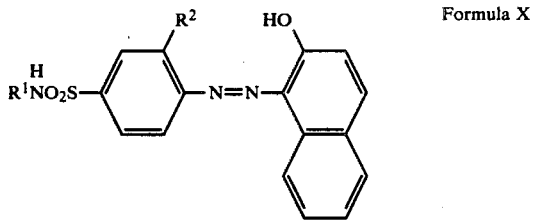

Formula X in which R¹ and R² each have the same respective meanings given in Formula VII.

In the third of its composition of matter aspects, the invention sought to be patented resides in novel (N-substituted sulfonamido) anilines and acetanilides having the formula

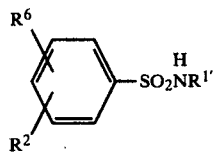

Formula XI in which R¹' represents -alkylene-NH-alkylene-NH₂ or alkylene-NCH₂CH₂NHC=O
|_____| in which alkylene represents —CH₂CH₂— or —CH₂CH₂CH₂—, R² represents hydrogen, C₁ to C₃ alkoxy or C₁ to C₃ alkyl and R⁶ represents nitro, amino or acetamido; or the acid-addition salt forms of said compounds.

In one of its process aspects, the invention sought to be patented resides in the process for preparing (N-substituted sulfonamido) disazo compounds according to Formulas I, II and III which comprises in the first step interacting sulfonic acid substituted disazo compounds with chlorosulfonic acid and thionyl chloride to obtained chlorosulfonyl substituted disazo compounds and in a second step, interacting the chlorosulfonyl-substituted disazo compounds obtained in step one with an excess of an amine of the formula H₂NR¹ to obtain the (N-sulfonamido) substituted disazo compounds wherein $R^1$ has the same respective meanings given in relation to Formulas I, II and III.

In a second of its process aspects, the invention sought to be patented resides in the process for preparing (N-substituted sulfonamido) disazo compounds according to Formulas IV and V which comprises in a first step diazotizing the appropriate (N-substituted sulfonamido)-$R^2$-aniline and a second step two molecular proportions of the diazotized aniline are coupled with one molecular proportion of a coupling component wherein $R^1$ and $R^2$ each have the same respective meanings given in Formulas IV and V.

In a third of its process aspects, the invention sought to be patented resides in the process for preparing (N-substituted sulfonamido) disazo compounds according to Formula VI which comprises in a first step, diazotizing a known azo compound (aminobenzenesulfonic acid-$R^3$-aniline) and coupling the diazonium salt with approximately one molecular proportion of a coupling component, a 2-hydroxynaphthalenesulfonic acid; in a second step, interacting the disazo compound thus formed with chlorosulfonic acid and thionyl chloride; in a third step, interacting the resulting (chlorosulfonated) disazo compound with an excess of amine of the formula $H_2NR^1$; and in a fourth step, isolating the resulting mixture of (N-$R^1$-sulfonamido) disazo compounds.

In a fourth of its process aspects, the invention sought to be patented resides in the process for preparing a (N-substituted sulfonamido) monoazo compound according to Formula VII which comprises in a first step diazotizing a (N-substituted sulfonamido) aniline of the formula

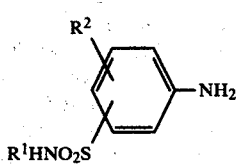

and coupling the resulting diazonium salt with approximately one molecular equivalent of a coupling component of the formula

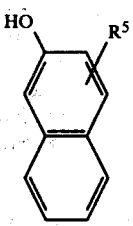

to obtain the corresponding (N-substituted sulfonamido) monoazo compounds in which $R^1$, $R^2$, $R^5$ and x each have the same respective meanings given in Formula VII.

In a fifth of its process aspects, the invention sought to be patented resides in the process for preparing a N-[2-(2-oxo-imidazolidin-1-yl)sulfonamido]-$R^2$-nitrobenzene according to Formula XI in which $R^{1'}$ represents N-[2-(2-oxo-imidazolidin-1-yl)ethyl] and $R^6$ represents nitro which comprises interacting a $R^2$-nitrobenzene-sulfonyl chloride with an excess 1-(2-aminoethyl)-2-imidazolidinone in the presence of pyridine wherein $R^2$ has the same meanings given in relation to Formula XI.

In a sixth of its process aspects, the invention sought to be patented in the process for preparing a N-[2-(2-oxo-imidazolidin-1-yl)ethyl]sulfonamido-$R^2$-aniline according to Formula XI in which $R^{1'}$ represents N-[2-(2-oxo-imidazolidin-1-yl)ethyl] and $R^6$ represents amino which comprises reducing the corresponding N-[2-(2-oxo-imidazolidin-1-yl)ethyl]sulfonamido-$R^2$-nitrobenzene wherein $R^2$ has the same respective meanings given in Formula XI.

In a seventh of its process aspects, the invention sought to be patented resides in the process for preparing a N-[N'-(2-aminoethyl)-2-aminoethyl]sulfonamido-$R^2$-anilines according to Formula XI wherein $R^{1'}$ represents N-[N'-(2-aminoethyl)-2-aminoethyl] and $R^6$ represents amino which comprises in a first step hydrolyzing the corresponding N-[2-(2-oxo-imidazolidin-1-yl)ethyl]-sulfonamido-$R^2$-aniline in a strong acidic medium and in a second step rendering the resulting mixture from the first step alkaline wherein $R^2$ has the same respective meanings given in Formula XI.

In an eighth of its process aspects, the invention sought to be patented resides in the process for preparing N-[2-(2-oxo-imidazolidin-1-yl)ethyl]sulfonamido-$R^2$-acetanilides according to Formula XI wherein $R^{1'}$ represents N-[2-(2-oxo-imidazolidin-1-yl)ethyl] and $R^6$ represents acetamido which comprises interacting the corresponding $R^2$-acetanilide sulfonyl chloride with 1-(2-aminoethyl)-2-imidazolidinone in the presence of an alkali metal carbonate and pyridine wherein $R^2$ has the same respective meanings given in Formula XI.

In a ninth of its process aspects, the invention sought to be patented resides in the process for preparing N-[N'-2-aminoethyl)-2-aminoethyl]sulfonamido-$R^2$-anilines according to Formula XI in which $R^{1'}$ represents N-[N'-(2-aminoethyl)-2-aminoethyl] and $R^6$ represents amino which comprises in a first step hydrolyzing the corresponding N-[2-(2-oxo-imidazolidin-1-yl)ethyl]sulfonamido-$R^2$-acetanilide in a strong acidic medium and in a second step rendering the resulting mixture from the first step wherein $R^2$ has the same meanings given in relation to Formula XI.

As used herein the term "$C_1$ to $C_3$ alkyl" and "$C_1$ to $C_4$ non-tertiary alkyl" denotes saturated monovalent straight and branched aliphatic hydrocarbon radicals including methyl, ethyl, propyl, isopropyl, butyl, secondary butyl and isobutyl.

The term "$C_1$ to $C_3$ alkoxy" includes saturated, acylic, straight or branch-chained groups such as methoxy, ethoxy, propoxy and isopropoxy.

The term "acid-addition salt" is used herein to mean that the respective acid molecules are present in the dyestuff molecule in the form of acid addition adducts. It will, of course, be understood that the precise type of bonding will depend on the condition in which the dyestuff molecule exists, that is, as a discrete solid or dissolved in solution. Thus, in the former, it would be expected that the acidic materials would be bound by quaternization of primary, secondary and tertiary amino substituents of the aminoalkylenesulfonamido tail chains while in the latter, it would be expected although the aminoalkylenesulfonamido substituents would also be predominantly in the quaternized form, some dissociation is possible in such an "acid-base" system.

The instant novel acid-addition salt forms of the (N-substituted sulfonamido) azo dyestuffs provide shades of yellow to blue-red. They have valuable properties as water-soluble direct dyes useful in the dyeing art for coloring natural fibers, synthetic fiber-forming materials and cellulose materials such as threads, sheets, filaments, textile fabrics and the like as well as in the manufacture of paper, varnishes, inks, coatings and plastics. Further, the free base forms of the (N-substituted sulfonamido) azo dyestuffs including the N-[2-(2-oxoimidazolidin-1-yl)ethyl]sulfonamido derivative are useful as pigments and as pigment additives.

The (N-substituted sulfonamido) azo dyestuffs and the water-soluble acid-addition salts thereof of this invention are characterized by good lightfastness. The azo dyestuffs in the form of their water-soluble acid-addition salts are useful as dyes for dyeing operations, and in the water-insoluble free base forms as well as their acid-addition salt forms as pigments for printing operations on woven and non-woven substrates made from natural fibers, such as wool, cellulose or linen, those made from semi-synthetic fibers, such as regenerated cellulose as represented by rayon or viscose, or those made from synthetic fibers, such as polyaddition, polycondensation or polymerization compounds. Such dyeings or printings can be carried out in accordance with the usual dyeing and printing processes.

The (N-substituted sulfonamido) azo dyestuffs and their acid-addition salt forms of this invention are also suitable for surface coloring or printing paper products and cardboard as well as for coloring paper pulps. Moreover, they are useful for incorporation into lacquers and films of various constitutions, for example, those made from cellulose acetate, cellulose propionate, polyvinyl chloride, polyethylene, polypropylene, polyamides, polyesters of alkyd resins. In addition, the subject compounds are suitable for coloring natural or synthetic resins, for example, acrylic resins, epoxy resins, polyester resins, vinyl resins, polystyrene resins, or alkyd resins.

The (N-substituted sulfonamido) azo dyestuffs are readily converted to the corresponding water-soluble dyes by treatment in an aqueous solution containing from 0.5 to 10 equivalents of one or more of an inorganic acid, aliphatic or hydroxyaliphatic carboxylic acid and alkanesulfonic acid selected from the group consisting of hydrochloric, hydrobromic, acetic, propionic, glycolic, 3-hydroxypropionic, lactic, methanesulfonic and ethanesulfonic acids.

The acid-addition salt forms can be isolated from the aqueous solution in which they are formed by techniques well known in the art, for example, by salting out, precipitation or concentration by evaporation. However, the water-soluble dyes thus formed are readily utilized in the form of aqueous solutions for many of their applications, especially dor dyeing cellulose. Accordingly, it is particularly preferred to retain the dyes in a concentrated aqueous solution of the type regularly employed in the paper industry for dyeing paper products.

The acid-addition salt forms are especially valuable dyes for imparting stable yellow to blue-red shades to paper both sized and unsized. For use in the paper trade, the acid-addition salt forms of this invention have several outstanding advantages. Their high degree of water-solubility makes them particularly suitbale for the preparation of liquid dye concentrates which are preferred in the paper industry. The use of concentrated aqueous solutions is particularly advantageous in view of the increasing trend toward automation, since these solutions are conveniently handled and added to the pulp slurry in accurately measured amounts by means of pump and meters. The subject aqueous dye concentrates are particularly suited to metered dyeing operations because they have low viscosity which remains essentially unchanged over long periods under ordinary storage conditions. Their low viscosity provides another advantage in that they dissolve readily in the pulp slurry and prevent specking or blotching seen when more viscous dye concentrates are used. A further advantage of the concentrated aqueous solutions is that of convenience in shipping and handling. In shipping and its use, the high degree of solubility of the acid-addition salt forms permit handling of solutions containing a higher dye content and results in a desirable decrease in the weight and volume of solution per amount of dye. Furthermore, the concentrated aqueous dye solutions are more convenient for the paper mills in that the handling of dry dye, with the concomitant dusting and caking problems associated with dissolving the dye prior to its addition to the pulp slurry are eliminated.

The subject dyes constituting my invention are generally less prone to "bleed" than dyes heretofore known when paper impregnated therewith is wet and placed in contact with moist white paper. This is a particularly desirable property for dyes designed for coloring absorbent grades of paper used in facial tissues, napkins, paper towels and the like wherein it can be foreseen that the colored paper, wetted with common household liquids such as water, soap and detergent solutions, milk, carbonated and alcoholic beverages, vinegar, rubbing alcohol, and so forth, may come in contact with other surfaces such as textiles, paper and the like which should be protected from stain. Another advantageous property of these new water-soluble dyes for use in the paper trade is found in their high degree of color discharge when bleached with hypochlorite or "chlorine" bleach. This property of the acid-addition salt forms is particularly desired by papermakers in order that dyed paper may be completely bleached prior to reprocessing. Still another advantageous property of the water-soluble dyestuffs of this invention is found in their high resistance to a change of shade when used to color cellulosic materials, which have either previously been treated with or are treated subsequent to dyeings, with wet-strength resin.

I have also found that the dyes of this invention have a high degree of substantivity for bleached fiber such as is used in most colored disposable paper products. Moreover, they are absorbed by cellulosic fibers from aqueous solution at a very rapid rate. These properties are advantageous to the paper industry, because it allows the dye to be added to the pulp just prior to formation of the sheet.

The best mode contemplated by the inventor of carrying out this invention will now be described as to enable any person skilled in the art to which it pertains to make and use the same.

In accordance with one of its process aspects of this invention, the (N-substituted sulfonamido) disazo compounds according to Formulas I, II and III are prepared by first preparing the appropriate (chlorosulfonyl substituted) disazo compound by interacting the corresponding (sulfonic acid substituted) disazo compound with chlorosulfonic acid and thionyl chloride and, second, interacting the resulting (chlorosulfonyl substituted) disazo compound with the appropriate amine of the formula $H_2NR^1$ to obtain the desired ($R^1N$-sulfonamido substituted) disazo compound of Formulas I, II or III. By way of illustration, the disazo compound (4,4'-diaminodiphenyldisulfide→2 moles of 2-hydroxy-6-naphthalenesulfonic acid is first interacted with chlorosulfonic acid and thionyl chloride. The reaction is conveniently carried out in excess chlorosulfonic acid at a temperature in the range of 10° to 70° C. After the reaction mixture is cooled to ambient temperature, it is poured onto ice to obtain the desired (chlorosulfonated) disazo compound. In the second step, the (chlorosulfonated) disazo compound is interacted with an excess of amine having the formula $H_2NR^1$, for example, the N,N-dialkylalkylenediamine, 3-dimethylaminopropylamine. This reaction is conveniently carried out in an aqueous medium in the presence of an alkaline carbonate, for example, potassium carbonate and an organic base, for example, pyridine at a temperature in the range of 20° to 85° C. After cooling to 35° to 45° C., the reaction mixture is adjusted to a pH of approximately 7.9 using an inorganic acid, for example, hydrochloric acid and the desired (3-dimethylaminopropylsulfonamido) substituted disazo compound of Formula I is isolated by filtration.

The disazo compounds of Formulas IV and V and the mixtures of monoazo compounds of Formula VII are conveniently obtained in accordance with another of the process aspects of this invention. In general, the novel azo compounds of this invention can be prepared essentially the same procedure. The particular products obtained, that is the dyestuff of Formulas IV, V or VII are dependent on the nature of the substituents of the starting amine as is discussed hereinbelow. Thus the appropriate diazotized (N-substituted sulfonamido)-$R^2$-aniline is coupled with the appropriate coupling component, for example, 4,4'-bi-acetoacet-o-toluidide or N,N-bis(3-hydroxy-2-naphthocarbonyl)diaminoethane. By way of illustration, two molecular proportions of 2-methoxy-5-N-{[N'-(2-aminoethyl)-2-aminoethyl]sulfonamido}aniline are dissolved in a dilute aqueous mineral acid, for example, hydrochloric acid and chilled by the addition of ice to a temperature in the range of 0° to 15° C., preferably 0° to 5° C. and diazotized by the addition of dilute aqueous solution of sodium nitrite. In a second container the coupling component, for example, 4,4'-bi-acetoacet-o-toluidide, is dissolved in a dilute alcohol-water solution of an inorganic base, for example, sodium hydroxide or potassium hydroxide with heating if necessary, to complete solution. The coupling component solution is gradually added to the diazonium salt solution or alternatively the diazonium salt solution is gradually added to the coupling solution, but in either case, a temperature in the range of 15° to 20° C. is maintained during the strike with the addition of ice to the reaction mixture. This reaction mixture is then stirred to complete the coupling and develop the color at a temperature in the range of 30° to 35° C. After the coupling is complete, the reaction mixture is adjusted to pH 8.0–9.0 with the addition of an inorganic base, for example, sodium hydroxide or potassium hydroxide and the alcohol is distilled from the reaction mixture. The resulting mixture is cooled by the addition of ice and the corresponding N-{[N'-(2-aminoethyl)-2-aminoethyl]sulfonamido}disazo compound of Formula IV is isolated by filtration.

In accordance with a still another process aspect of the invention, the compounds represented by Formula VI are prepared by dissolving the azo compound (sulfanilic acid→2-methoxyaniline) in a dilute aqueous mineral acid, for example, hydrochloric acid and chilled by the addition of ice to a temperature in the range of 10° to 25° C. and diazotizing the azo compound by the addition of dilute aqueous solution of sodium nitrite. In a second container the coupling component, for example, 2-hydroxy-6-naphthalenesulfonic acid, is dissolved in a dilute solution of an inorganic base, for example, sodium carbonate. The coupling solution is then chilled to 0° to 10° C. by the addition of ice and the cold diazonium salt solution is then gradually added to the coupling solution maintaining 0° to 10° C. and slight alkalinity by the addition of ice and sodium carbonate respectively. This reaction mixture is stirred to complete the coupling and develop the color at ambient temperature. After the coupling is complete, the disazo disulfonic acid disodium salt is isolated by filtration. In subsequent steps, the disazo compound containing two sulfonic acid moieties is then interacted with chlorosulfonic acid and thionyl chloride to obtain the chlorosulfonated product which is further reacted with an excess of amine of the formula $H_2NR^1$, each of these steps being similar to those described above for the compounds of Formula VI.

In accordance with yet another one of the process aspects of this invention, the N-[2-(2-oxo-imidazolidin-1-yl)ethyl]sulfonamido-$R^2$-nitrobenzenes of Formula XI are prepared by interacting a nitrobenzenesulfonyl chloride and 1-(2-aminoethyl)-2-imidazolidinone. The reaction is conveniently carried out in an organic base, for example, pyridine at a temperature in the range of 85° to 95° C. The reaction solution of N-[2-(2-oxo-imidazolidin-1-yl)ethyl]sulfonamido-$R^2$-nitrobenzene is heated to remove a portion of the reaction medium by evaporation, cooled to ambient temperature and a dilute aqueous solution of a mineral acid, for example, hydrochloric acid is added. The resulting slurry is cooled to a temperature in the range of 0° to 5° C. and the substituted nitrobenzene of Formula XI collected by filtration. The product may be purified by recrystallization from any suitable solvent, for example, ethyl alcohol.

In accordance with another one of the process aspects of this invention, the N-[2-(2-oxo-imidazolidin-1-yl)ethyl]-$R^2$-sulfonamidoanilines of Formula XI are prepared by reducing the corresponding N-[2-(2-oxo-imidazolidin-1-yl)ethyl]sulfonamido-$R^2$-nitrobenzene. The reduction is conveniently carried out in a dilute aqueous alcoholic solution in the presence of an inorganic acid, for example, hydrochloric acid using the appropriate reducing agent, for example, powdered metallic iron at the reflux temperature of the reaction medium. The resulting reaction mixture is made slightly alkaline by the addition of an alkaline carbonate, for example, sodium carbonate, treated with decolorizing charcoal and clarified. The clarified solution is concentrated by evaporation and the product of Formula XI is isolated by filtration.

In accordance with a still further process aspect of the invention, the N-[N'-(2-aminoethyl)-2-aminoethyl]-sulfonamido-$R^2$-anilines of Formula XI are prepared by hydrolyzing the corresponding N-[2-(2-oxo-imidazolidin-1-yl)ethyl]sulfonamido-$R^2$-anilines. The hydrolysis is conveniently carried out in a dilute aqueous acid, for example, sulfuric acid at the reflux temperature. The hydrolysis solution is made slightly alkaline by the addition of concentrated ammonium hydroxide and the N-[N'-(2-aminoethyl)-2-aminoethyl]sulfonamido-$R^2$-anilines of Formula XI are isolated by filtration.

In accordance with another of the process aspects of the invention, the N-[2-(2-oxo-imidazolidin-1-yl)ethyl]- sulfonamido-$R^2$-acetanilides of Formula XI are prepared by interacting the appropriate acetamido-$R^2$-benzenesulfonyl chloride and 1-(2-aminoethyl)-2-imidazolidinone. The reaction is conveniently carried out in water in the presence of an alkaline carbonate, for example, sodium carbonate and an organic base, for example, pyridine at a temperature in the range of 20° to 60° C. The product is isolated by filtration.

The N-[N'-(2-aminoethyl)-2-aminoethyl]sulfonamido-$R^2$-anilines of Formula XI are conveniently prepared by hydrolyzing the corresponding N-[2-(2-oxo-imidazolidin-1-yl)ethyl]sulfonamido-$R^2$-acetanilides in a dilute aqueous acid. The hydrolysis solution is made slightly alkaline by the addition of concentrated ammonium hydroxide and the N-[N'-(2-aminoethyl)-2-aminoethyl]sulfonamido-$R^2$-anilines of Formula XI are isolated.

The generally known monoazo and disazo compound starting materials are identified herein by the well known nomenclature shorthand, amine→coupling agent, for example, aniline→β-naphthol, which signifies the diazotized amine is coupled to the coupling agent.

The requisite monoazo and disazo compounds useful as starting materials are known as a class in the art and are commercially available or can be readily obtained by procedures well known in the prior art.

The requisite chlorosulfonyl-$R^2$-nitrobenzenes and chlorosulfonyl-$R^2$-acetanilides useful as starting materials are known as a class in the art and are commercially available or can be readily obtained by procedure well known in the art.

The requisite 1-(2-aminoethyl)imidazolidinone intermediate is a known compound readily obtained by procedures taught in U.S. Pat. Nos. 2,613,212 and 2,868,727. Thus, one molecular equivalent of urea is interacted with one molecular equivalent of diethylene triamine liberating ammonia. The reaction can be carried out neat or in the presence of water which is distilled off during the course of the reaction. The reaction is conveniently carried out at a temperature in the range of 100° to 250° C. The 1-(2-aminoethyl)imidazolidinone can be used directly from the reaction or it can be distilled at reduced pressure before using.

The reactive amine intermediate required for interaction with the (chlorosulfonyl) disazo and monoazo compounds to obtain the compounds of Formulas I, II, III, IV, V, VI and VII wherein $R^1$ is alkylene-N-non-tertiary-($C_1$ to $C_4$ alkyl)$_2$ are known compounds whose preparation is well-known in the prior art. The following compounds are exemplary of these reactive amine compounds useful in the practice of this invention.
3-Dimethylaminopropylamine,
3-Diethylaminopropylamine,
3-Dibutylaminopropylamine,
2-Dimethylaminoethylamine,
2-Diethylaminoethylamine,
2-Diisopropylaminoethylamine
and
4-Diethylaminobutylamine.

The following examples set forth the methods of preparation of the (N-substituted sulfonamido) disazo and monoazo compounds; acid-addition salts thereof; and (N-substituted sulfonamido) substituted anilines, acetanilides and nitrobenzenes. Included in the following examples are the results of the "bleed" tests as described in Example 1 of samples of paper prepared from pulp dyed with the products of the following examples. In these "bleed" tests the dyed sample of paper is wetted with the appropriate household liquid and placed as a filler between clean, dry, white filter paper. After a period of time, the so-called "sandwich" is disassembled and the component piece mounted and dried. The filter papers are then examined under daylight and evaluated with respect to the amount of dye which bled from the dyed paper sample to the filter paper.

EXAMPLE 1

A. With stirring, 158.0 g of 1-(2-aminoethyl)-2-imidazolidinone and 63.6 g of sodium carbonate were added to 200.0 ml of cold water and the mixture stirred for approximately one and one half hours. At approximately 20° C., there was added to this mixture, 120.4 g of 97 percent 4-acetamidobenzenesulfonyl chloride in small increments over approximately fifteen minutes. Two milliliters of pyridine was added bringing the pH to 9.6. After approximately forty-five minutes of stirring at approximately 25° C., the pH had dropped to 9.3 and was adjusted to 9.6 by the addition of 3.0 ml of 50 percent aqueous sodium hydroxide. After stirring approximately eighteen hours at ambient temperature, the pH was 9.0. The addition of 4.0 ml of 50 percent aqueous caustic brought the pH to 9.5. The slurry was stirred approximately one hour at 50° to 55° C. After cooling the slurry to room temperature, the solid was collected by filtration and washed with three 250.0 ml portions of cold water. The yellow filter cake was added to 1250.0 ml of warm water with stirring, and the slurry heated to and maintained at 90° to 95° C. for approximately one and one half hours. The hot slurry was then filtered. The filtrate was set aside at 9° C. for four days. The residue was extracted a second time with 500.0 ml of water, at 95° to 98° C. for two hours, filtered without cooling and dried to obtain 17.0 g of an insoluble white solid. In the first water extract, a pale yellow solid separated from solution. The solid was collected by filtration and dried to obtain 107.5 g of 4-N-[2-(2-oxo-imidazolidin-1-yl)ethyl]sulfonamidoacetanilide (Formula XI:

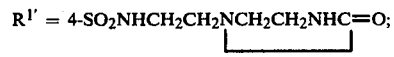

$R^2$=H; $R^6$=acetamido) which melted over the range 168° to 173.5° C. The filtrate from the second water extraction was chilled at 2° to 4° C. for approximately twenty-four hours and the yellow solid which formed was collected by filtration and dried in vacuo at 80° C. to obtain 3.7 g of a solid which melted at 173° to 174.5° C.

B. A mixture consisting of 72.0 ml of 37 percent hydrochloric acid, 40.0 ml of water, 40.0 ml of glacial acetic acid and 65.3 g of 4-N-[2-(2-oxo-imidazolidin-1-yl)ethyl]sulfonamidoacetanilide obtained in part A above, was heated with stirring at reflux temperature for approximately thirty-one hours. After cooling to room temperature, the solution was poured into 350.0 ml of water and with stirring 142.0 ml of concentrated ammonium hydroxide was added maintaining a pH of 8.0–8.5 for approximately two hours. The pH was slowly adjusted to 7.0 by the addition of 14.0 ml of 37 percent hydrochloric acid. The resulting solution was evaporated to dryness with gentle heating. The residue was added to 400.0 ml of ethyl alcohol and refluxed for approximately one hour. Without cooling, the solid was collected by filtration, washed two times, each with 50.0 ml of portions of ethyl alcohol, and dried in vacuo at 55° to 60° C. to obtain 35.4 g of 4-N-{[N'-(2-aminoethyl)-2-aminoethyl]sulfonamido}aniline (Formula XI: $R^{1'}=4\text{-}C_2H_4NHC_2H_4NH_2$; $R^2=H$; $R^6=NH_2$) which melted over the range 218° to 225.5° C. The alcohol filtrate was cooled overnight at approximately 9° C. and the solid which precipitated was collected by filtration, washed two times, each with 25.0 ml of cold ethyl alcohol, and dried at 55° to 60° C. in vacuo to obtain 20.5 g of 4-N-{[N'-(2-aminoethyl)-2-aminoethyl]sulfonamido}aniline which melted at 223° and 225.5° C. This 20.5 g of product was added to 50.0 ml of distilled water and with stirring, 10.0 ml of concentrated hydrochloric acid and 1.0 g of decolorizing charcoal was added. After approximately five minutes, the mixture was filtered. The clear filtrate was poured into 500.0 ml of isopropyl alcohol and the resulting slurry was placed in a refrigerator overnight. The solid was collected by filtration, washed with isopropanol and dried at 70° to 75° C. in vacuo to obtain 16.1 g of trihydrochloride salt which melted at 238° to 242° C.

The nuclear magnetic resonance spectrum was concordant with the assigned structure. Mass spectral analysis of the free base showed m/e peaks at 228(M+—$C_2H_4NH_2$) and 156(M+—$NHC_2H_4NHC_2H_4NH_2$).

C. To a solution of 12.9 g of 4-N-{[N'-(2-aminoethyl)-2-aminoethyl]sulfonamido}aniline obtained in part A above in 100.0 ml of water and 25.0 ml of concentrated hydrochloric acid, there was added crushed ice to lower the temperature to approximately 0° C. The amine was diazotized at a temperature in the range of 0° to 10° C. by adding 30.5 ml of a 10 percent aqueous sodium nitrite solution. The reaction mixture was stirred at a temperature of less than 10° C. for approximately 30 minutes after which time the excess nitrite was removed by the gradual addition of sulfamic acid until the nitrite ion could no longer by detected by testing with starch-iodide test paper. Sodium acetate was added slowly to the cold diazonium solution until slightly alkaline to Congo Red test paper and 0.03 ml of nonylphenoxypoly(ethyleneoxy)ethanol (Igepol ® CO-630) was added.

D. In a separate container, 12.2 g of 3-hydroxy-2-naphth-o-anisidide was mixed with 100.0 ml of warm water, 50.0 ml of isopropyl alcohol and 6.0 ml of 50 percent aqueous solution of sodium hydroxide.

E. The solution thus obtained in part D above was added in a thin stream to the diluted diazonium solution from part C above. When the addition was complete, the mixture had a pH of 4.5 which remained approximately constant after stirring overnight at ambient temperature. The resultant orange mixture was adjusted to pH 8.5 by the addition of concentrated ammonium hydroxide and heated to 50° to 55° C. for approximately two hours. This mixture was heated at 75° to 85° C. for one half hour and filtered. The filter cake was washed three times, each with 160.0 ml of one percent aqueous sodium chloride solution, and air dried to obtain 19.3 g of the orange dyestuff having the formula

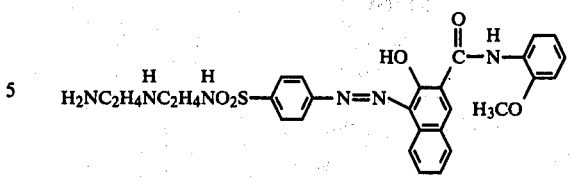

The orange solid obtained above was added to a mixture of 200.0 ml of water, 40.0 ml of glacial acetic acid and 20.0 ml of methyl alcohol and heated with stirring at reflux temperature for approximately one hour, cooled slightly and 2.0 g of diatomaceous earth was added and the heating continued for approximately one half hour. The hot mixture was filtered and the filter cake washed with 75.0 ml of hot water. The clear orange filtrate was added to 600.0 ml of isopropyl alcohol and the resulting mixture placed in a refrigerator overnight. In the morning the separated solid was collected by filtration, washed four times, each with 100.0 ml of cold isopropyl alcohol, and dried in a vacuum oven at 50° to 55° C. to obtain 4.7 g of acetic acid salt of the dyestuff.

The visible absorption spectrum of an aqueous acetic acid solution of this dyestuff, containing 0.02 g of dye per liter of solution showed a maximum at 500 millimicrons, A=0.753.

F. A concentrated dye solution was prepared by adding 2.39 g of this dyestuff from part E above to a mixture of 8.0 ml of water, 3.2 g of glacial acetic acid and 1.6 g of ethylene glycol. The mixture was stirred until solution was complete. Paper dyed with aqueous dilutions of this concentrate had a red-orange shade and was found to be highly bleachable in the bleach test described below. The dye was found to bleed moderately in the water bleed test and have an appreciable bleed in the soap and milk bleed tests when tested in accord with the procedure described below.

DYEING PROCEDURE

A 0.1 percent stock dye solution was prepared by diluting 6.45 g of the concentrated dye solution from part F above to a volume of one liter with distilled water. With stirring, 150.0 ml of the 0.1 percent dye solution was added to 100.0 g of an aqueous slurry containing approximately 3 grams of bleached kraft pulp (600 Canadian Standard Freeness). Agitation was continued for approximately fifteen minutes prior to dilution with water to a volume of four liters with agitation. The dyed pulp was then formed into an 8 by 8 inch square of paper by means of a filter-box. The paper sheet was pressed between two blotters and then dried at 180° F. for four minutes between two fresh dry blotters to yield a uniformly dyed red-orange paper sheet.

B. Sized Paper Grades:

With stirring, 150.0 ml of the 0.2 percent stock dye solution was added to 100.0 g of an aqueous slurry containing 3 grams of bleached kraft pulp (600 Canadian Standard Freeness). After approximately three minutes of stirring, 5.0 g of a 1.5 percent water solution of papermaker's alum was added. Stirring was continued for approximately fifteen minutes before it was diluted to four liters with water and the pH adjusted to 5.0 with dilute sulfuric acid. The dyed fiber slurry was drawn into an 8 by 8 inch square of paper and dried as described in part A above.

TESTING PROCEDURE

The following test procedures were employed to determine the resistance of the dyestuffs to bleed in moist paper, to bleed from paper in the presence of soap or milk, and to bleaching with hypochlorite bleach.

WATER "BLEED" TEST

This procedure is a modification of the AATCC Standard Test Method 15-1962, "Colorfastness to Perspiration."

Test pieces consisting of four plies, each one inch square, are cut from the dyed paper to be tested. One or more dyed papers of known dye migration quality are included in the test series as standards.

The absorbent material consists of filter paper having a relatively smooth finish (Whatman #1, 4.25 cm. dia. equivalent). In addition, smooth, flat, glass or clear plastic plates of adequate stiffness, measuring two inches wide and three inches long, are required as separating plates. A 1000 gram weight serves as a dead weight loading.

Four filter paper absorbent pieces are use for each dyed paper test square, two for each side.

The migration test "sandwich" is constructed as follows. A separating plate is placed on a horizontal support and two pieces of the filter paper placed centrally on this plate with the smoother side up. The square dyed paper test pieces, held by tweezers, are immersed in tap water at room temperature for five seconds, drained for five seconds, and immediately centered on the filter paper. Immediately, two pieces of filter paper are centered on the test square and followed at once by another separating plate. This "sandwich" is pressed for a moment with the fingers, after which, without delay, two pieces of filter paper are positioned on the top separating plate as before to receive a second test square of wetted dyed paper. The above procedure is then repeated as rapidly as possible and without interruption, stacking one "sandwich" on the other, until all dyed paper test pieces have been put under test.

As soon as a stack is completed, a 1000 gram weight is centered on the top separating plate. The stack is allowed to stand at room temperature (75° F.) for fifteen minutes.

At the end of the migration period, the stack is disassembled, and each dyed paper test square and its filter paper absorbents clipped to a supporting card. A separate card is used for each test square. The dyed paper test squares and filter papers are air dried at room temperature for at least two hours (in the dark) before ranking. Relative degrees of dye migration, as compared to that from standard samples, are determined by visual ratings, in daylight, of the intensity of dye stain on the filter paper surfaces which had been in contact with the test square.

The evaluations are graded on the basis of the following scale:

| Bleed Grade | Definition |
|---|---|
| none | no observable bleed |
| trace | first noticeable bleed |
| slight | approximately twice the trace amount of dye bleed |
| moderate | approximately four times the trace amount of dye bleed |
| appreciable | approximately eight times the trace amount of dye bleed |
| much | approximately sixteen times the trace amount of dye bleed |
| very much | approximately thirty-two times the trace amount of dye bleed |

SOAP BLEED TEST

This procedure utilizes the same method employed in the Water Bleed Test described above, except that the dyed paper test squares are immersed in a 0.5 percent tap water solution of white soap flakes (a mixture of 80 percent sodium soap and 20 percent potassium soap produced from 70 percent tallow and 30 percent coconut oil glyceride blend; "Ivory" brand, Proctor and Gamble Co.) at 120° F., instead of water alone.

MILK BLEED TEST

This procedure utilizes the same method employed in the water bleed test described above, except that the dyed paper squares are immersed in room temperature homogenized milk instead of water.

BLEACH TEST

This procedure compares the degree to which the color of dyed papers would be discharged in a waste paper recovery operation employing hypochloric bleach.

A preliminary estimate of bleachability is obtained by placing a drop of hypochlorite bleach, containing 2.5 percent available chlorine; on the dyed paper and allowing it to dry at room temperature. From this test, both rate and degree of bleachability are estimated.

A more accurate test, approximating paper mill procedure, is performed by defibering three grams of dyed paper in 150.0 ml of distilled water using a kitchen blender. The defibered pulp slurry is placed in a jar and hypochlorite is added to the extent desired, usually 2.5 percent available chlorine based on the weight of the dry fiber. The slurry consisting of pulp and hypochlorite is adjusted to pH 9 with dilute sulfuric acid or dilute aqueous solution of sodium hydroxide and placed in a water bath to maintain the interval in the temperature range of 115° F. and 125° F. After the test is started, the jar is loosely capped. At five minute intervals, the cap is tightened and the jar inverted twice to circulate the liquor. The cap is loosened between inversions. After twenty minutes, the pH is checked, and if higher than 7.5, is adjusted thereto. The test is then continued for an additional twenty minutes (with five minutes between inversions). The terminal pH is generally found to be 6.0-6.5. An excess of sodium thiosulfate is added as an antichlor, mixed for five minutes and the slurry is diluted to a concentration of approximately 0.3 percent of fiber. Sheets are then prepared at pH 7 without a washing step. Finally, this sheet is pressed and dried in a paper dryer. Control dyeings at specific levels can then be made to accurately determine the loss of strength of color on bleaching.

EXAMPLE 2

A. Following a procedure similar to that described in Example 1, parts C, D and E above, 12.9 g of 4-N-{[N'-

(2-aminoethyl)-2-aminoethyl]sulfonamido}aniline from Example 1, part B above was diazotized and coupled to 4.4 g of 2-hydroxynaphthalene to obtain, after extraction with isopropyl alcohol, 6.0 g of an orange solid having the formula

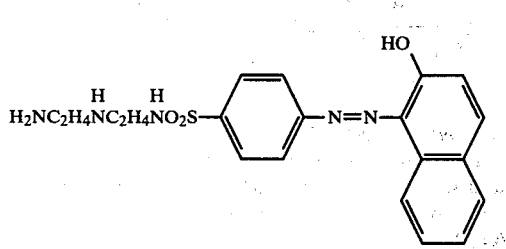

The visible absorption spectrum of an aqueous acetic acid solution of this dyestuff, containing 0.02 g of dye per liter of solution showed a maximum at 484 millimicrons, A=0.683.

B. A concentrated dye solution was prepared by adding 5.0 g of the dyestuff from part A directly above to a mixture of 10.0 ml of water, 4.0 g of glacial acetic acid and 2.0 g of ethylene glycol. The mixture was stirred until solution was complete. Paper dyed with aqueous dilutions of this concentration had an orange shade and was found to be highly bleachable in the bleach test described above. The dye was found to bleed moderately in the water bleed test and to have much bleed in both the milk and soap bleed tests when tested in accord with the procedure described above.

EXAMPLE 3

A. To a solution of 160.0 ml of dry pyridine and 25.8 g of 1-(2-aminoethyl)-2-imidazolidinone there was added 46.5 g of m-nitrobenzenesulfonyl chloride in small increments over approximately one hour. The reaction mixture was heated and maintained at 87° to 93° C. for approximately one hour and slowly 100.0 ml of pyridine was distilled from the reaction mixture. After cooling, 400.0 ml of water and 25.0 ml of concentrated hydrochloric acid were added with stirring to the reaction mixture. The resultant slurry was cooled to approximately 5° C. by means of an external ice bath and the solid was collected by filtration. The filter cake was suspended in 350.0 ml of water and stirred for approximately one hour. The solid was collected by filtration, washed with water and dried in a vacuum oven at 90° to 95° C. to obtain 36.0 g of 3-N-[2-(2-oxo-imidazolin-1-yl)ethyl]sulfonamidonitrobenzene (Formula XI:

$R^{1'} = $ 3-SO$_2$NHCH$_2$CH$_2$NCH$_2$CH$_2$NHC=O;

$R^2$=H; $R^6$=NO$_2$). The solid was added to 300.0 ml of ethyl alcohol, heated at reflux for approximately one hour, cooled slightly and filtered to remove and insolubles. The filtrate was cooled to room temperature and placed in a refrigerator overnight. The separated solid was collected by filtration and dried in vacuo at 50° to 60° C. to obtain 28.0 g of purified product which melted over the range 117° to 139° C.

B. A mixture of 19.0 g of finely powdered iron, 70.0 ml of water and 0.5 ml of concentrated hydrochloric acid was heated at reflux for approximately fifteen minutes and 250.0 ml of ethyl alcohol was added slowly while maintaining reflux. The heat source was removed and 26.8 g of 3-N-[2-(2-oxo-imidazolidin-1-yl)ethyl]sulfonamidonitrobenzene from part A above was added in small increments at a rate sufficient to maintain a gentle reflux. After the addition was complete, the mixture was refluxed for an additional three hours. The reaction mixture was cooled slightly and 3.0 g of sodium carbonate and 2.0 g of decolorizing charcoal were added and reflux temperature was maintained for an additional thirty minutes. Without cooling the reaction mixture was clarified by filtering through a diatomaceous earth coated filter and the residue washed with 50.0 ml of ethyl alcohol. The filtrate was concentrated by evaporation and the solid which formed was collected by filtration, washed with 35.0 ml of ethyl alcohol and dried in vacuo at 50° to 55° C. to obtain 20.0 g of 3-N-[2-(2-oxo-imidazolidin-1-yl)ethyl]sulfonamidoaniline (Formula XI:

$R^{1'} = $ 3-SO$_2$NHCH$_2$CH$_2$NCH$_2$CH$_2$NHC=O;

$R^2$=H; $R^6$=NH$_2$) which melted over the range of 168° to 174° C. Seventeen grams of this product was slurried in 100.0 ml of water, filtered and dried to obtain 16.3 g of purified product.

C. With stirring, a mixture of 13.0 ml of water, 4.7 g of concentrated sulfuric acid and 4.26 g of 3-N-[2-(2-oxo-imidazolidin-1-yl)ethyl]sulfonamidoaniline obtained in part B above was heated at reflux for approximately 38 hours during which time carbon dioxide was evolved. After cooling, concentrated ammonium hydroxide was added slowly to the reaction mixture until it was alkaline to Brilliant Yellow test paper. The resulting mixture was placed in a refrigerator overnight. The solid which formed was collected by filtration, washed with 10.0 ml of cold water and dried to obtain 0.89 g of the starting aniline. A thin layer chromatographic analysis of the filtrate disclosed that 3-N-[N'-(2-aminoethyl)-2-aminoethyl]sulfonamidoaniline (Formula XI: $R^{1'}$=3-NHC$_2$H$_4$NHC$_2$H$_4$NH$_2$; $R^2$=H; $R^6$=NH$_2$) was the major product present.

D. Proceeding in a manner similar to that described in Example 1, parts C, D and E above, 29.4 ml of the solution from part C directly above containing predominantly 3-N-[N'-2-aminoethyl)-2-aminoethyl]sulfonamidoaniline was diazotized and the diazonium salt coupled to 2.93 g of 3-hydroxy-2-naphth-o-anisided to obtain 21.0 g of a water wet filter cake of the dyestuff having the formula

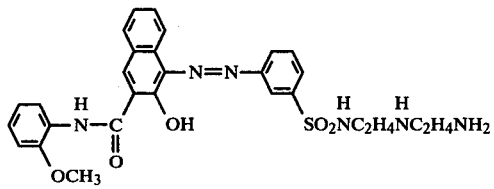

With stirring, the water wet filter cake was mixed with 10.0 ml of a glacial acetic acid and 2.0 g of urea. The resulting solution was filtered to remove trace amounts of insolubles.

The visible absorption spectrum of an aqueous dilution containing the acetic acid addition salt of the dyestuff solution showed a maximum at 495 millimicrons.

EXAMPLE 4

A. To 180.0 g of chlorosulfonic acid, 42.5 g of o-methoxyacetanilide was added slowly while maintaining 25° to 30° C. by means of an ice-water bath. The reaction mixture was stirred approximately twelve hours and then was added slowly to a mixture of ice and water keeping the temperature under 15° C. The solid which formed was collected by filtration and washed almost neutral to Congo Red test paper with cold water. The filter cake was added slowly to a mixture consisting of 200.0 ml of cold water, 47.8 g of 1-(2-aminoethyl)-2-imidazolidinone, 37.6 g of potassium carbonate and 1.0 ml of pyridine while maintaining approximately 30° C. by means of an external ice-water bath. The resulting mixture was stirred overnight at ambient temperature. The resulting slurry was heated gradually during two hours to 65° C. and maintained at approximately 65° C. for ninety minutes. After cooling, the solid was collected by filtration, washed with cold water and dried in a vacuum oven at 50° to 55° C. to obtain 58.6 g of 2-methoxy-5-N-[2-(2-oxo-imidazolidin-1-yl)ethyl]sulfonamidoacetanilide (Formula XI:

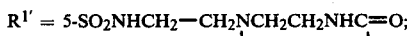

$R^2$=2-OCH$_3$; $R^6$=acetamido) which melted over the range 163° to 167° C.

B. With stirring, 50.8 g of the mixture containing 2-methoxy-5-N-[2-(2-oxo-imidazolidin-1-yl)ethyl]sulfonamidoacetanilide from part A above, was added slowly to a solution of 35.0 ml of concentrated sulfuric acid dissolved in 186.0 ml of water. The resulting mixture was heated at reflux temperature for approximately five hours, 16.0 ml of concentrated sulfuric acid was added and the reflux was maintained for an additional 19 hours. After cooling, the resulting solution was added slowly to 2000.0 ml of isopropyl alcohol with stirring. The resulting mixture was set aside in the refrigerator overnight. The separated solid was collected by filtration, washed with one liter of isopropyl alcohol and dried in a vacuum oven at 75° to 80° C. to obtain 73.2 g of sulfuric acid addition salt of 2-methoxy-5-N-{[N'-(2-aminoethyl)-2-amino-ethyl]sulfonamido}aniline (Formula XI: $R^{1'}$=5-NHC$_2$H$_4$NHC$_2$H$_4$NH$_2$; $R^2$=2-OCH$_3$; $R^6$=NH$_2$) which melted over the range of 91° to 104° C.

C. Following a procedure similar to that described in Example 1, parts C, D and E above, 34.0 g of sulfuric acid addition salt 2-methoxy-5-N-{[N'-(2-aminoethyl)-2-aminoethyl]sulfonamido}aniline from part B directly above, was diazotized and the resulting diazonium salt coupled to 19.5 g of 3-hydroxy-2-naphth-o-anisidide to obtain 36.5 g of the monoazo compound having the formula

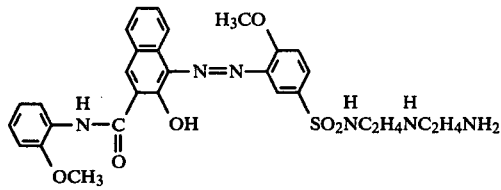

as a red-colored solid.

The visible absorption spectrum of an aqueous acetic acid solution containing 0.02 g of dyestuff per liter of solution showed a maximum at 410 millimicrons, A=0.417.

EXAMPLE 5

A. To a solution of 34.0 g of the sulfuric acid addition salt of 2-methoxy-5-N-{[N'-(2-aminoethyl)-2-aminoethyl]sulfonamido}aniline, prepared in a manner similar to that described in Example 4, part B above, in 100.0 ml of water, was added 12.0 ml of concentrated hydrochloric acid and 200.0 g of crushed ice. The amine was diazotized at a temperature between 0° to 5° C. by slowly adding a solution of 4.9 of sodium nitrite dissolved in 31.0 ml of water. The reaction mixture was stirred for one hour at a temperature in the range of 0° to 5° C. after which time the excess nitrite was removed by the gradual addition of sulfamic acid until the nitrite ion could no longer by detected on starch-iodide test paper. Slowly, sodium acetate was added to the cold diazonium solution until the solution tested neutral to Congo Red test paper.

B. In a separate container, 13.2 g of 4,4'-biacetoaceto-toluidide, 28.0 ml of isopropyl alcohol, 133.0 ml of warm water and 4.2 ml of 50 percent aqueous sodium hydroxide were stirred until a solution resulted.

C. The solution of the coupling component from part B directly above was added in a thin stream to the cold diazonium solution from part A above. The reaction mixture was stirred at a temperature in the range of 15° to 20° C. approximately two hours and stirring continued at 30° to 35° C. until there was no diazonium salt remaining. The pH was adjusted from 3.5 to 8.5 by the addition of 50 percent sodium hydroxide. The resulting slurry was heated, distilling off isopropyl alcohol until the temperature of 102° C. was reached and approximately 60.0 ml of distillate was collected. The slurry was cooled and the solid collected by filtration, washed with water and dried in a vacuum oven at 50° to 55° C. to obtain 28.9 g of disazo compound having the formula

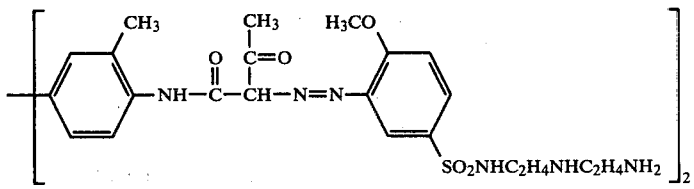

a yellow-colored solid.

The visible absorption spectrum of an aqueous acetic acid solution of this dyestuff, containing 0.02 g of dye per liter of solution showed a maximum at 401 millimicrons, A=0.716.

D. The 28.9 g of solids from part C above was added to a mixture of 100.0 ml of water and 10.0 ml of glacial acetic acid and stirred at ambient temperature for approximately six hours. The volume of the solution was adjusted to 825.0 ml with water, heated to approximately 75° C., cooled and allowed to stand overnight at room temperature. The solution was filtered to remove a trace of insoluble matter. With stirring, the filtrate was adjusted to pH 8.5–9.0 with the slow addition of 50 percent aqueous sodium hydroxide and the resulting mixture heated at 75° to 80° C. for approximately one hour and cooled to ambient temperature. The solid which separated was collected by filtration and washed with a small amount of cold water. The wet cake was dissolved in 15.0 ml of glacial acetic acid and 10.0 ml of water.

Paper dyed with aqueous dilutions of this concentrate had a green-yellow shade and was found to be 93 percent bleachable in the bleach test described hereinabove. The dye was found to exhibit no bleed in the water, soap or milk bleed tests described hereinabove.

E. With stirring, 3.0 g of the dyestuff from the same starting materials prepared in a manner similar to that described in part C above, was added slowly to 75.0 ml of distilled water and 3.0 ml of concentrated hydrochloric acid was added. The mixture was heated to 60° to 70° C. and a gel-like solution formed. An additional 3.0 ml of concentrated hydrochloric acid was added to the gel. With stirring, the gel was added to 400.0 ml of isopropyl alcohol and stirring continued for one hour. The resulting solid was collected by filtration, washed with isopropyl alcohol and dried. The dried solid was dissolved in a mixture of 100.0 ml of water and 10.0 ml of ethylene glycol with heating. After filtering the cloudy solution to remove a trace of insolubles, the filtrate obtained was added to 450.0 ml of isopropyl alcohol. Upon standing overnight, the solid which formed was collected by filtration, washed with isopropyl alcohol and dried in vacuo to obtain 2.6 g of the hydrochloride salt of the dyestuff indicated in part C above.

The visible absorption spectrum of an aqueous solution of this hydrochloride salt of this dyestuff, containing 0.02 g of the salt per liter of solution showed a maximum at 404 millimicrons, A=0.838.

EXAMPLE 6

A. With stirring, 152.0 g of water wet filter cake containing 3-acetamido-4-methoxybenzenesulfonyl chloride, prepared as described in Example 4, part A above, was added slowly to a mixture consisting of 200.0 ml of water, 37.8 g of dimethylaminopropylamine, 27.6 g of potassium carbonate and 1.0 ml of pyridine while maintaining a temperature in the range of 30° to 35° C. by means of an external ice-water bath. After stirring overnight at ambient temperature, the separated solid was collected by filtration, washed with 100.0 ml of 5 percent aqueous sodium chloride solution and 100.0 ml of ice water. The cake was dried in a vacuum oven at 55° C. to obtain 65.9 g of 2-methoxy-5-(dimethylaminopropylsulfonamido)acetanilide (Formula XI: $R^{1'}=5\text{-}SO_2NHC_3H_6N(CH_3)_2$; $R^2=2\text{-}OCH_3$; $R^6=$acetamido), a solid, which melted over the range 144° to 148° C.

B. A mixture consisting of 150.0 ml of water, 40.0 ml of concentrated hydrochloric acid and 33.0 g of 2-methoxy-5-(dimethylaminopropylsulfonamido)acetanilide obtained in part A above, was heated at reflux with stirring for approximately two hours. The resulting solution was cooled and allowed to stand overnight at ambient temperature. In the morning 300.0 g of crushed ice was added and the amine was diazotized at a temperature in the range of 0° to 5° C. by adding a solution of 7.0 g of sodium nitrite dissolved in 44.0 ml of water. The reaction mixture was stirred for one hour at less than 5° C. after which the excess nitrite was removed by the gradual addition of sulfamic acid until the nitrite ion could no longer by detected by testing with starch-iodide test paper. The cold solution was made slightly alkaline to Congo Red test paper by the addition of sodium acetate.

C. In a separate container 18.9 g of 4,4''-bi-acetoaceto-toluidide was mixed with 190.0 ml of warm water, 40.0 ml of isopropyl alcohol and 6.0 ml of 50 percent aqueous sodium hydroxide. The solution thus obtained was added in a thin stream to the cold diazonium solution obtained in part B above. The reaction mixture, pH 4.5, was stirred at 15° to 20° C. until consumption of the diazonium salt was complete. The mixture was warmed to approximately 35° C. and adjusted with 50 percent caustic until alkaline to Brilliant Yellow test paper. The slurry was heated to 50° C. and the solid was collected by filtration and washed with water. The water wet filter cake was suspended in two liters of water and sodium carbonate was added until the slurry was alkaline to Brilliant Yellow test paper. The slurry was maintained in the temperature range of 80° to 95° C. for approximately ninety minutes, cooled and the solid collected by filtration, washed with water and dried in vacuo to obtain 45.0 g of a disazo compound having the formula

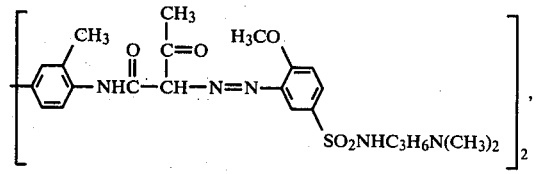

as a yellow-colored solid.

The visible absorption spectrum of an aqueous acetic acid solution of this dyestuff, containing 0.02 g of dye per liter of solution showed a maximum at 403 millimicrons, A=1.154.

Paper dyed with dilute acetic acid solutions of this dyestuff had a green-yellow shade and was found to be 100 percent bleachable in the bleach test described hereinabove. The dye was found not to bleed in the water and milk bleed tests and to bleed slightly in the soap bleed test described hereinabove.

D. With stirring, a mixture of 3.0 g of the dyestuff from part C above and 50.0 ml of 2-ethoxy-1-ethanol was heated at reflux for approximately one hour. After cooling to ambient temperature, the solid was collected by filtration, washed with 25.0 ml of 2-ethoxy-1-ethanol and dried in vacuo at 50° C. The dried solid was added to 100.0 ml of distilled water, heated to 50° C. and 10.0 ml of glycolic acid was added. The resultant mixture was stirred at 70° C. for approximately ninety minutes, cooled and poured into 300.0 ml of acetone. The yellow precipitate which formed was collected by filtration. The acetone-water-wet solid was added to 100.0 ml of distilled water with stirring and was heated to 70° C. for approximately one hour. The resulting solution was filtered to remove a trace of insolubles and the clear filtrate added to 300.0 ml of acetone. The yellow precipitate was collected by filtration and dried at 50° C. to obtain the glycolic acid addition salt of the dyestuff.

EXAMPLE 7

A. Proceeding in a manner similar to that described in Example 6, part A above, a water-wet filter cake containing 58.2 g of 3-acetamido-4-methoxybenzenesulfonyl chloride was interacted with 59.3 g of dibutylaminopropylamine in a solution consisting of 200.0 ml of water, 23.7 g of potassium carbonate and 1.0 ml of pyridine at ambient temperature overnight. The solid which formed was collected by filtration, washed with 1.5 liters of ice cold water and dried in a vacuum oven at 40° C. to obtain 76.2 g of 2-methoxy-5-(dibutylaminopropyl)sulfonamidoacetanilide (Formula XI: $R^{1'}=5-SO_2NH-C_3H_6N(C_4H_9)_2$; $R^2=2-OCH_3$; $R^6$=acetamido) which melted over the range 59° to 64° C.

B. Following the procedures described in Example 6, parts B and C above, 41.4 g of 2-methoxy-5-(dibutylaminopropyl)sulfonamidoacetanilide from part A directly above was hydrolyzed to obtain the hydrochloride salt solution of the amine. The amine hydrochloride was diazotized and the resulting diazonium salt was coupled to 18.9 g of 4,4'-bi-acetacet-o-toluidide. The separated dyestuff was collected by filtration, washed with water until the filtrate was free of alkali when tested with Brilliant Yellow test paper and dried in vacuo at a temperature in the range of 90° to 100° C. to obtain 55.5 g of a disazo compound having the formula

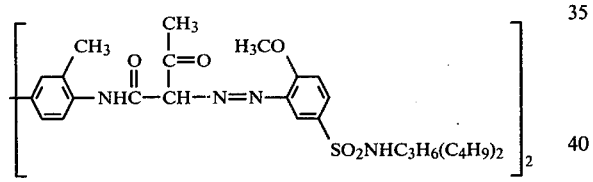

The visible absorption spectrum of an aqueous acetic acid solution of this dyestuff, containing 0.02 g of dye per liter of solution showed a maximum at 400 millimicrons, A=0.981.

Paper dyed with a dilute acetic acid solution of this dyestuff had a yellow shade and was found to be highly bleachable in the bleach test described hereinabove. The dye was found not to bleed in the water and milk bleed tests and to bleed only slight in the soap bleed test described hereinabove.

EXAMPLE 8

With stirring, 22.5 g of the pigment 4,4'-diaminodiphenyldisulfide→1-hydroxynapthalene-4-sulfonic acid was added gradually to 200.0 g of chlorosulfonic acid while maintaining a temperature in the range of 20° to 25° C. by means of an external ice-water bath. The resulting mixture was heated gradually to approximately 60° C. and stirred one hour at approximately 60° C. Slowly, over approximately thirty minutes, 11.6 ml of thionyl chloride was added to the mixture while maintaining a temperature in the range of 53° to 60° C. The reaction mixture was stirred approximately 20 hours at approximately 60° C. After cooling to 20° C., the reaction mixture was added slowly with stirring to a mixture of 300.0 g ice, 300.0 ml of water and 25.0 g of sodium chloride maintaining a temperature below 10° C. by the gradual addition of an additional 500.0 g of ice. After stirring the resulting slurry for approximately thirty minutes at a temperature in the range of 0° to 10° C., the solid was collected by filtration and washed with two liters of two percent aqueous sodium chloride solution to obtain 97.4 g of water-wet filter cake containing the disazo compound having the formula

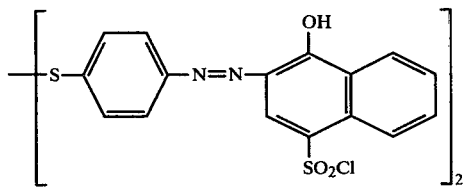

B. At a temperature in the range of 20° to 25° C., 48.7 g of the water-wet filter cake from part A directly above, was added with stirring to a mixture of 70.0 ml of water and 7.7 g of dimethylaminopropylamine. After stirring approximately three hours at ambient temperature, the reaction mixture was heated to a temperature in the range of 75° to 80° C. and maintained in this range for approximately two hours. After cooling the reaction slurry to approximately 40° C., the pH was adjusted to 7.9 with the addition of three normal aqueous hydrochloric acid. The solid was collected by filtration, washed with water and dried to obtain 8.8 g of the disazo compound having the formula

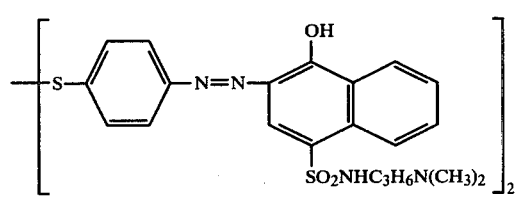

as a dark red solid, which melted over the range 220° to 230° C. with decomposition.

The visible absorption spectrum of an aqueous acetic acid solution of this dyestuff, containing 0.02 g of dye per liter of solution showed a maximum at 505 millimicrons, A=0.480.

Paper dyed with a dilute acetic acid solution of this dyestuff had a blue-red shade and was found to be highly bleachable in the bleach test described hereinabove. The dye was found not to bleed in the water bleed test and to bleed only slightly in the milk bleed test described hereinabove.

EXAMPLE 9

A. Following a procedure similar to that described in Example 8, part A above, 22.0 g of the pigment 4,4'-diaminodiphenyldisulfide→2-hydroxynaphthalene-6-sulfonic acid was interacted with 5.8 ml of thionyl chloride in chlorosulfonic acid to obtain 79.5 g of water-wet filter cake containing the disazo compound having the formula

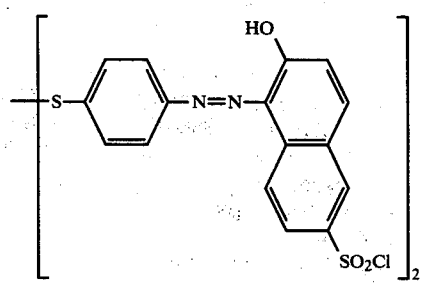

B. Proceeding in a manner similar to that described in Example 8, part B above, 39.75 g of the water-wet pulp from part A directly above was interacted with 7.7 g of dimethylaminopropylamine to obtain 10.3 g of the disazo compound having the formula

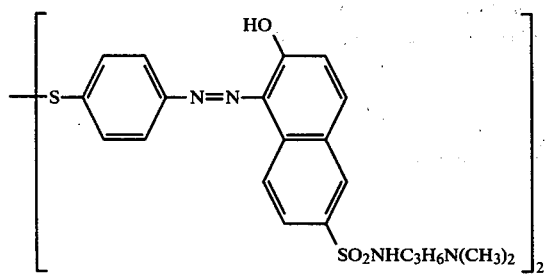

The visible absorption spectrum of an aqueous acetic acid solution of this dyestuff, containing 0.025 g of dye per liter of solution showed a maximum at 484 millimicrons, A=0.906.

Paper dyed with a dilute acetic acid solution of this dyestuff had a yellow-red shade and was found to be highly bleachable in the bleach test described hereinabove. The dye was found to have a trace of bleed in the water bleed test described hereinabove.

EXAMPLE 10

A. In a manner similar to that described in Example 8, part A above, 24.0 g of the pigment, 4,4'-diaminodiphenyldisulfide→2-hydroxynaphthalene-3,6-disulfonic acid was interacted with 11.6 ml of thionyl chloride in chlorosulfonic acid to obtain 77.4 g of water-wet filter cake containing the disazo compound having the formula

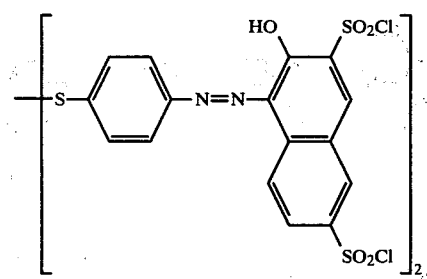

B. Following a procedure similar to that described in Example 8, part B above, 38.7 g of the water-wet filter cake from part A directly above was interacted with 15.4 g of dimethylaminopropylamine to obtain 18.9 g of the disazo compound having the formula

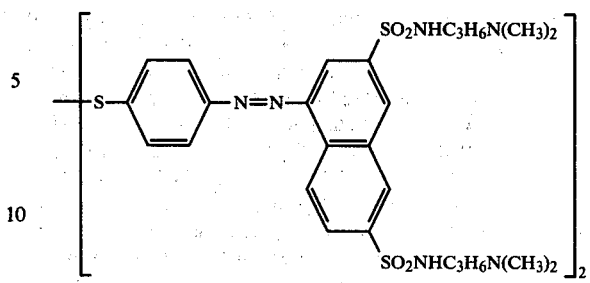

The visible absorption spectrum of an aqueous acetic acid solution of this dyestuff, containing 0.02 g of the dye per liter of solution showed a maximum at 496 millimicrons, A=0.348.

Paper dyed with a dilute acetic acid solution of this dyestuff had a yellow-red shade and was found to be highly bleachable in the bleach test described hereinabove. The dye was found to have a slight bleed in the water bleed test described hereinabove.

EXAMPLE 11

A. Proceeding in a manner similar to that described in Example 6, part B above, 14.2 g of 2-methoxy-5-(dimethylaminopropylsulfonamido)acetanilide was hydrolyzed to obtain the hydrochloride salt solution of the amine. This amine hydrochloride salt was diazotized by the addition of 3.0 g of sodium nitrite dissolved in 20.0 ml of water to form the diazonium salt.

B. A solution consisting of 8.4 g of N,N'-bis(3-hydroxy-2-naphthocarbonyl)diaminoethane, 80.0 ml of warm water, 20.0 ml of isopropanol and 4.5 ml of 50 percent aqueous sodium hydroxide was stirred approximately one hour and filtered to remove a trace of insoluble matter. To the filtrate, 140.0 ml of cold water was added and immediately the cold diazonium salt solution from part A above was added at such a rate as to maintain a temperature in the range of 10° to 15° C. The reaction mixture was stirred at a temperature in the range of 10° to 15° C. until the comsumption of the diazonium salt was complete. The pH of the slurry was adjusted to 8.0 by the addition of 50 percent aqueous sodium hydroxide and the metallic green-colored solid was collected by filtration, washed with water and dried to obtain 12.4 g of the disazo compound having the formula

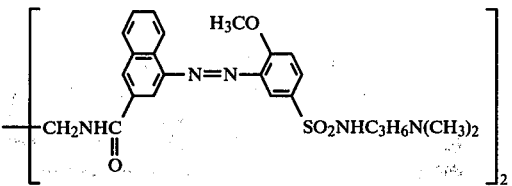

The visible absorption spectrum of an aqueous acetic acid solution of the dyestuff, containing 0.02 g of the dye per liter of solution showed a maximum at 502 millimicrons, A=0.506.

Paper dyed with a dilute acetic acid solution of this dyestuff had a yellow-red shade and was found to be highly bleachable in the bleach test described hereinabove. The dye was found to bleed slightly when in the water bleed test described hereinabove.

EXAMPLE 12

A. A solution consisting of 15.35 g of the azo dyestuff (sulfanilic acid→2-methoxyaniline), 260.5 ml of water and 5.0 g of sodium bicarbonate at 75° C. was added rapidly to a mixture of 220.0 g of crushed ice, 60.0 ml of water and 42.0 ml of concentrated hydrochloric acid to obtain a gelatinous mixture. While maintaining a temperature in the range of 17° to 21° C., 4.2 g of sodium nitrite dissolved in 10.0 ml of water was added slowly to the gelatinous mixture over approximately fifteen minutes. The reaction mixture was stirred at approximately 25° C. for two hours with excess nitrite, after which the excess nitrite was removed by the gradual addition of sulfamic acid until nitrite ion could no longer be detected by testing with starch-iodide test paper and the mixture was cooled to 10° C.

In a separate container, 37.2 g of 2-hydroxy-6-naphthalene sulfonic acid was dissolved in 450.0 ml of water and 175.0 ml of 15.4 percent aqueous sodium carbonate solution and 300.0 g of ice were added. Slowly, approximately 300.0 ml of the cold diazonium solution obtained above was added in a thin stream while maintaining 10° C. An additional 175.0 ml of 15.4 percent aqueous sodium carbonate was added and the remaining diazonium solution was added keeping the temperature under 10° C. The resulting pH was 8.0. After stirring overnight at ambient temperature, there was added to the solution, 225.0 g of sodium chloride and stirring continued. The solid which separated was collected by filtration, washed with approximately 900.0 ml of 20 percent aqueous sodium chloride solution and dried in vacuo at 65° C. to obtain 47.4 g of the disazo compound having the formula

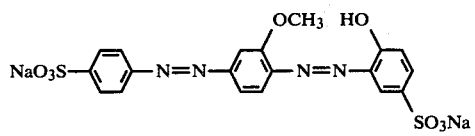

B. With stirring, 47.4 g of the red solid obtained in part A above, was added to 200.0 g of chlorosulfonic acid over approximately one hour while maintaining a temperature in the range of 20° to 25° C. After stirring the resulting mixture for approximately ninety minutes, 11.5 ml of thionyl chloride was added dropwise and this mixture was stirred overnight at room temperature. The reaction mixture was added slowly to a mixture of 300.0 ml of water, 300.0 ml of ice and 25.0 g of sodium chloride maintaining a temperature below 10° C. with the gradual addition of 600.0 g of ice. After the addition was complete, the resulting slurry was stirred 20-30 minutes, 25.0 ml of xylene was added, and stirring continued for 20 minutes. The solid was collected by filtration and washed with 200.0 ml of 2 percent aqueous sodium chloride solution. The filter cake was resuspended in 700.0 ml of 2 percent aqueous sodium chloride solution and stirred for approximately ten minutes at a temperature less than 10° C. The solid was collected by filtration from the suspension to obtain 92.1 g of the water-wet filter cake containing the chlorosulfonyl derivative of the dyestuff indicated in part A above.

C. To a mixture of 70.0 ml of water and 30.6 g of 3-dimethylaminopropylamine, slowly 92.1 g of the water-wet filter cake from part B above was added while maintaining 20° to 25° C. The resulting slurry was stirred overnight at ambient temperature. After diluting the slurry with 100.0 ml of water, it was heated to approximately 60° C., stirred approximately thirty minutes and the pH adjusted to 8.5 by the addition of 50.0 ml of 3 normal hydrochloric acid. The solid was collected by filtration and washed with 500.0 ml of hot water. The water-wet filter cake was resuspended in 500.0 ml of hot water and stirred at approximately 40° C. for approximately forty minutes, the solid collected by filtration, washed with hot water and dried in vacuo to obtain 99.9 g of the disazo compound having the formula

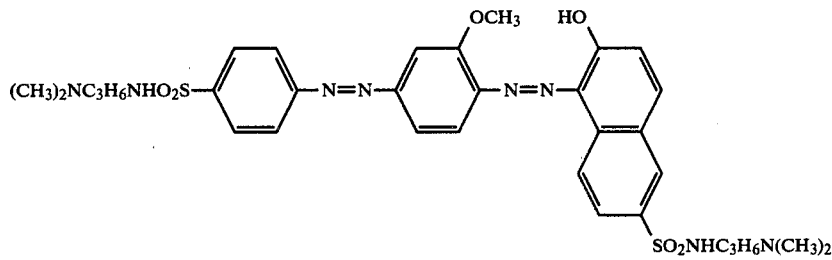

The visible absorption spectrum of an aqueous acetic acid solution of this dyestuff, containing 0.02 g of dye per liter of solution showed a maximum at 531 millimicrons, A=1.068. Paper dyed with a dilute acetic acid solution of this dyestuff had a violet-red shade and was found to be highly bleachable in the bleach test described above. The dye was found to bleed slightly from paper in the water bleed test described above.

What is claimed is:

1. A disazo compound bearing (N-substituted sulfonamido) groups said disazo compound selected from the group consisting of

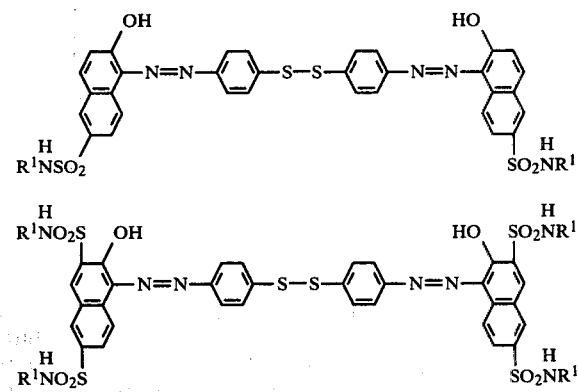

-continued

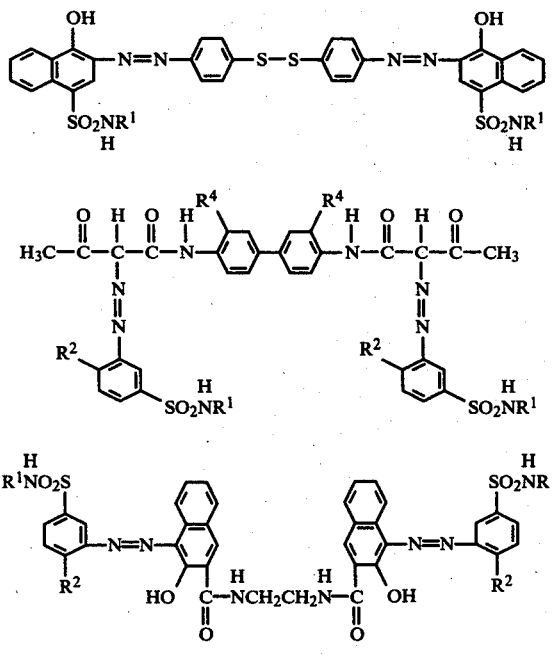

and

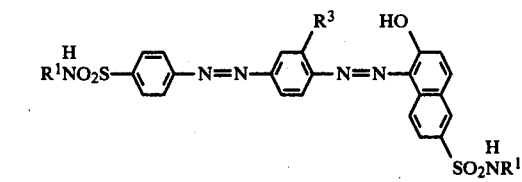

in which

R¹ represents a moiety selected from the group consisting of alkylene-NH-alkylene-NH₂, alkylene-N-(non-tertiary C₁ to C₁₄ alkyl)₂,

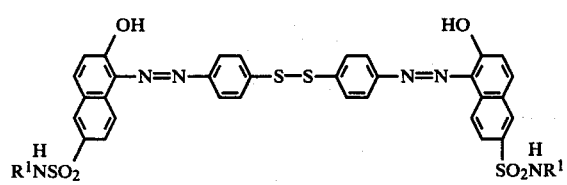

in which alkylene represents —CH₂CH₂— and —CH₂CH₂CH₂—,

R², R³, and R⁴ represent hydrogen, C₁–C₃ alkyl or C₁–C₃ alkoxy; or the acid-addition salt forms of said disazo compounds.

2. A disazo compound according to claim 1 of the formula

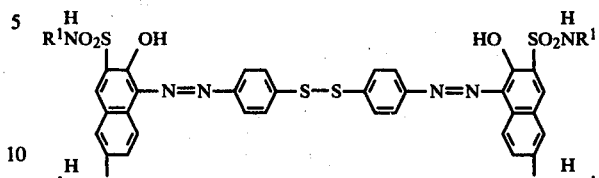

in which R¹ has the same respective meanings given in claim 1.

3. The disazo compound, according to claim 2 wherein, R¹ is —(CH₂)₃N(CH₃)₂.

4. A disazo compound, according to claim 1, of the formula

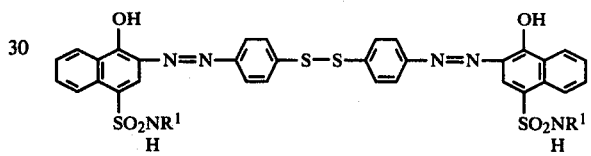

in which R¹ has the same respective meanings given in claim 1.

5. The disazo compound, according to claim 4 wherein, R¹ is —(CH₂)₃N(CH₃)₂.

6. The disazo compound, according to claim 4 wherein, R¹ is

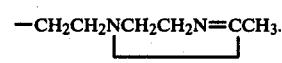

—CH₂CH₂NCH₂CH₂N=CCH₃.

7. A disazo compound, according to claim 1, of the formula

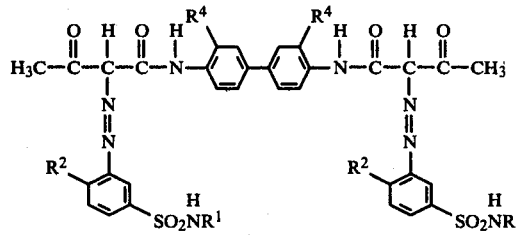

in which R¹ has the same respective meanings given in claim 1.

8. The disazo compound, according to claim 7 wherein, R¹ is —(CH₂)₃N(CH₃)₂.

9. A disazo compound, according to claim 1, of the formula in which R¹', R² and R⁴ each have the same respective meanings given in claim 1.

10. The disazo compound, according to claim 9 wherein, R¹ is —(CH₂)₃N(CH₃)₂, R² is methoxy and R⁴ is methyl.

11. The disazo compound, according to claim 9 wherein, R¹ is —(CH₂)₂H(CH₂)₂NH₂, R² is methoxy and R⁴ is methyl.

12. The disazo compound, according to claim 9 wherein, R¹ is —(CH₂)₃N(C₄H₉)₂, R² is methoxy and R⁴ is methyl.

13. A disazo compound, according to claim 1, of the formula

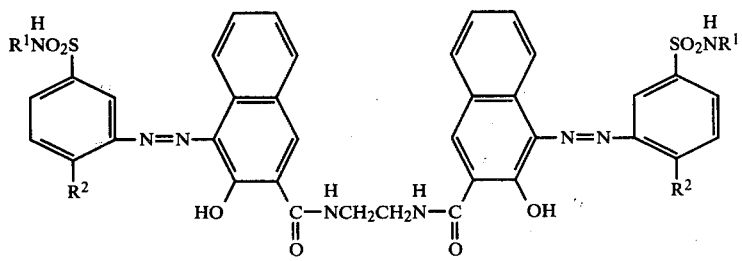

in which $R^1$ and $R^2$ each have the same respective meanings given in claim 1.

14. The disazo compound, according to claim 13 wherein, $R^1$ is $-(CH_2)_3N(CH_3)_2$ and $R^2$ is methoxy.

15. A disazo compound, according to claim 1, of the formula

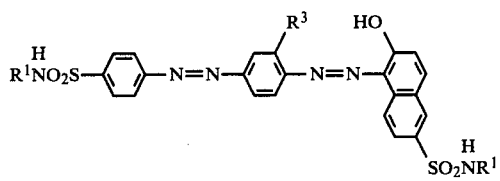

in which $R^1$ and $R^3$ each have the same respective meanings given in claim 1.

16. The disazo compound, according to claim 15 wherein, $R^1$ is $-(CH_2)_3N(CH_3)_2$ and $R^3$ is methoxy.

17. A process for preparing a (N-substituted) sulfonamido disazo compound according to claim 1 which comprises in the first step interacting poly(sulfonic acid) substituted disazo compound with chlorosulfonic acid and thionyl chloride to obtain a (chlorosulfonyl) substituted disazo compound and in a second step, interacting a (chlorosulfonyl) substituted disazo compound obtained in step one with an amine of the formula $H_2NR^1$ to obtain a (N-substituted sulfonamido) substituted disazo compound wherein $R^1$ has the same respective meanings given in relation to claim 1.

18. A process for preparing a (N-substituted sulfonamido) disazo compound according to claim 1 which comprises in a first step diazotizing the appropriate (N-substituted sulfonamido)-$R^2$-aniline and in a second step coupling two molecular proportions of the diazotized aniline with one molecular proportion of a coupling component wherein $R^1$ and $R^2$ each have the same respective meanings given in claim 1.

19. A process for preparing (N-substituted sulfonamido) disazo compound according to claim 15 which comprises in a first step diazotizing a known azo compound (aminobenzenesulfonic acid→$R^3$-aniline) and coupling the diazonium salt with approximately one molecular proportion of a coupling component, a 2-hydroxynaphthalenesulfonic acid; in a second step interacting the disazo dyestuff thus formed with chlorosulfonic acid and thionyl chloride; in a third step interacting the resulting poly(chlorosulfonated) disazo compound with an excess of an amine of the formula $H_2NR^1$; and in a fourth step isolating the resulting poly($R^1$-sulfonamido) disazo compound.

* * * * *